May 26, 1959 — F. ALBERT ET AL — 2,888,212
COMMINUTING MACHINE
Filed Nov. 30, 1955 — 4 Sheets-Sheet 1
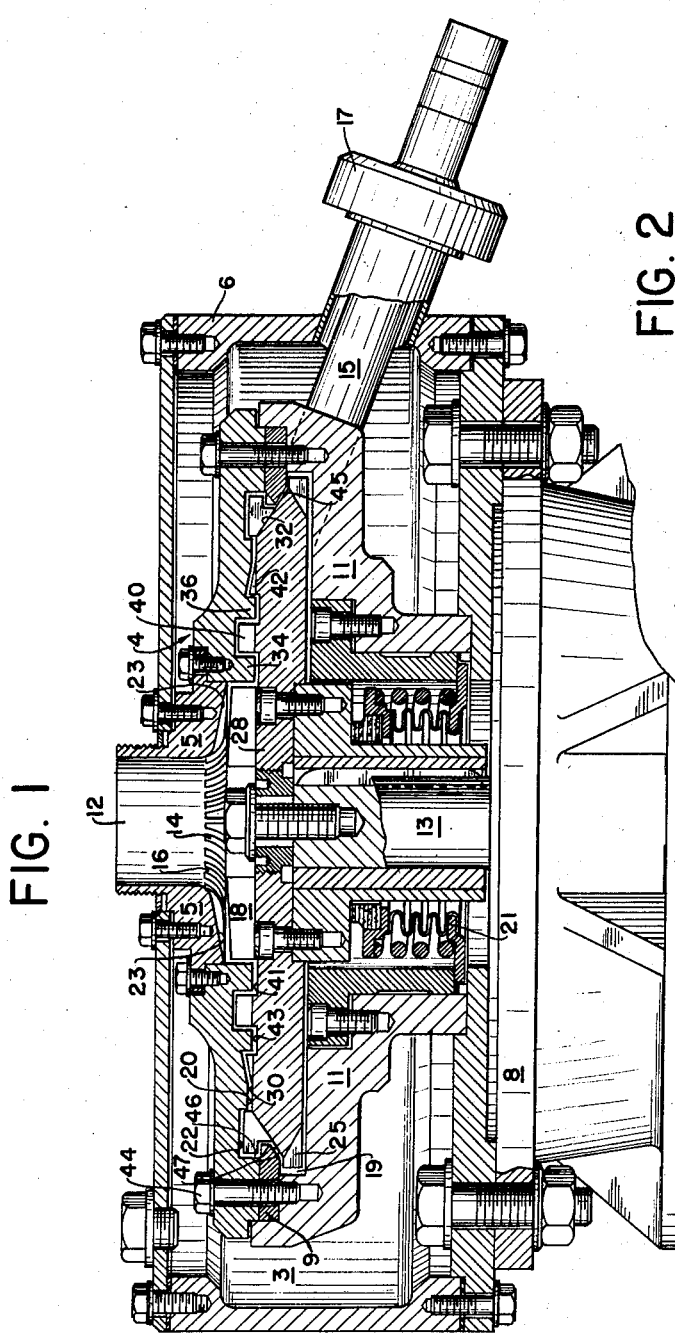
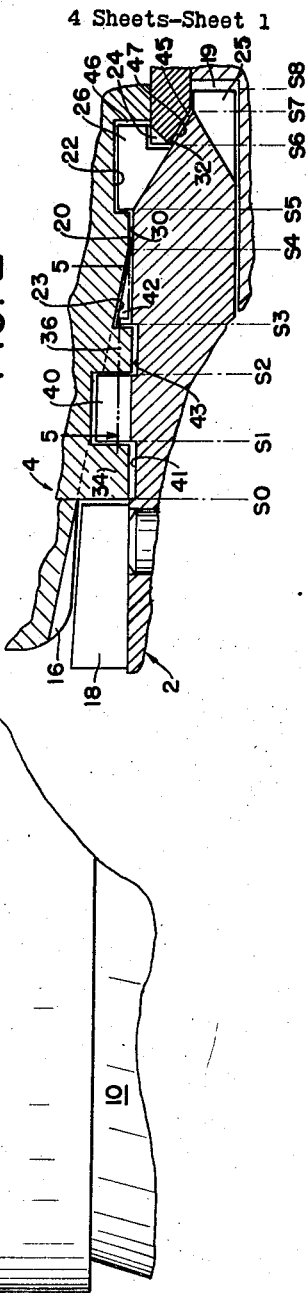
INVENTORS
FRANZ ALBERT
GUSTAV HUEBNER
BY
ATTORNEYS

INVENTORS
FRANZ ALBERT
GUSTAV HUEBNER
BY
ATTORNEYS

May 26, 1959  F. ALBERT ET AL  2,888,212
COMMINUTING MACHINE
Filed Nov. 30, 1955  4 Sheets-Sheet 3

INVENTORS
FRANZ ALBERT
GUSTAV HUEBNER
BY
ATTORNEYS

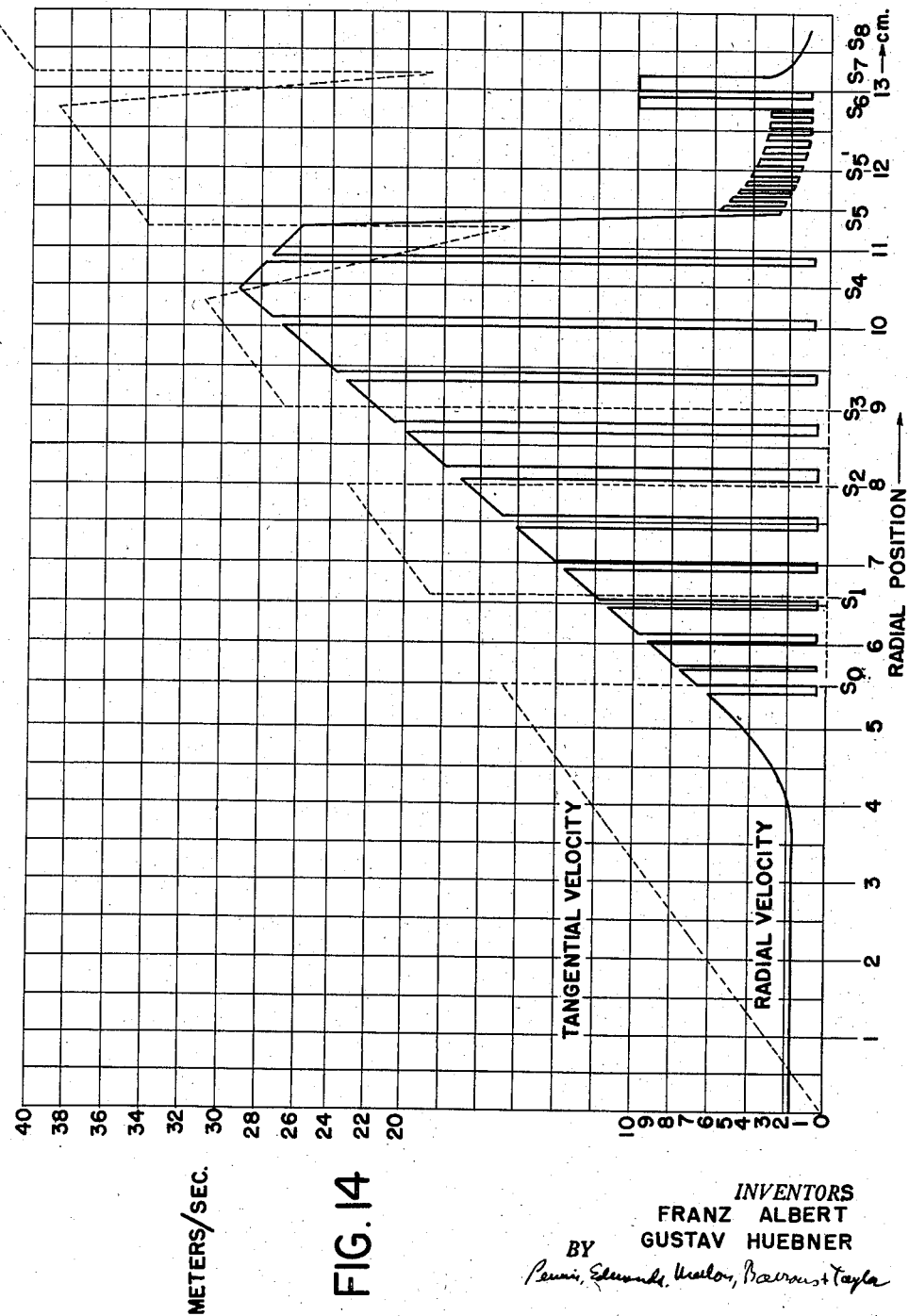

United States Patent Office 2,888,212
Patented May 26, 1959

2,888,212

COMMINUTING MACHINE

Franz Albert, Oberhausen, and Gustav Hübner, Buderich-Meererbusch, Germany, assignors to Societe d'Equipements Industriels et Laitiers, Paris, France, a French company Application November 30, 1955, Serial No. 550,182

3 Claims. (Cl. 241—46)

The present invention relates to comminuting apparatus through which the material to be comminuted is passed in the form of a suspension in a liquid medium, which apparatus may be used for comminution and also for the preparation of fine dispersions and emulsions. The invention provides a machine for these purposes employing two relatively rotating members, preferably a rotor and a stator, which define a space between them, the facing surfaces of which bear a plurality of interengaging concentric ridges interrupted by radial slots to form ring-shaped arrays of teeth projecting into this space. These arrays are so disposed radially and axially of each other by the relative positioning of rotor and stator members that with rotor motion the spaces or slots between the teeth of at least one array are cyclically closed off at their radially inner and outer limits to form chambers closed off on all sides except at the necessary running clearance between rotor and stator. The machine of the invention further includes radially outside these ridges an additional comminuting stage employing a large number of fine teeth on both members, moving within an annular cavity of relatively large cross section.

The invention will now be further described by reference to the accompanying drawings in which:

Fig. 1 is an axial section through a preferred embodiment of the machine of the invention;

Fig. 2 is a fragmentary sectional view similar to that of Fig. 1 but at an enlarged scale;

Fig. 14 is a plot of the radial and tangential velocities of a suspension in the course of its passage through a particular machine of the type illustrated in Figs. 1–13.

Figure 3:
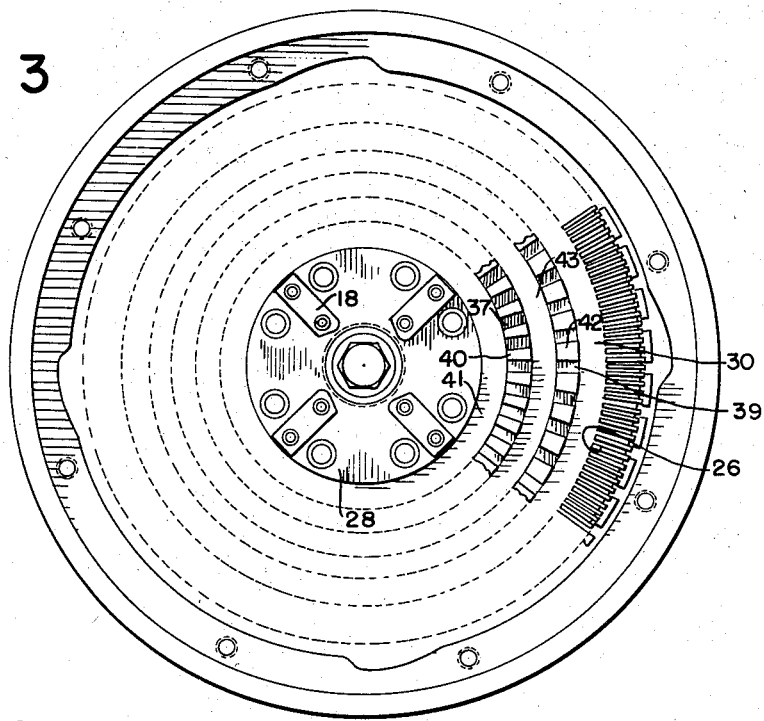
Fig. 3 is a plan view of the rotor of the machine of Fig. 1.

The machine of Fig. 1 includes rotor and stator members generally indicated at 2 and 4 respectively. Both are enclosed within a housing 6, which in the machine of Fig. 1 rests on a flange 8 belonging to a driving motor 10 coupled to the rotor for the operation of the machine.

In the embodiment shown, the portions of the stator operative in the comminuting process performed by the machine include two concentric annular portions 5 and 7, and a split ring 9, all bolted together and to an annular supporting member 11 which fits inside the housing concentrically about the shaft 13 to which the rotor is affixed. An annular space 3 formed between the exterior of the stator assembly just described and the housing is available for the circulation of a heating or cooling medium through inlet and outlet conduits not shown. Inside the stator assembly, an annular space 19 at the radially outer limit of the rotor 2 serves as a collecting space for the treated suspension after its passage through the operative parts of the machine. The treated suspension passes from this space 19, assisted by the pumping action of a plurality of blades 25 on the underside of the rotor, through one or more outflow pipes 15 to the exterior of the machine. The outflow pipes 15 may be passed through the housing 6 at flexible and watertight junctions such as that illustrated at 17.

The rotor is affixed to a shaft 13, which may be the shaft of the driving motor 10, and is borne in carefully fitted bearings not shown to run true within close tolerances both radial and axial. A spring-loaded bellows and packing assembly 21 prevents passage of the suspension under treatment into the motor.

The surface of the stator operative in the comminuting process is the face thereof presented to the rotor. In the embodiment illustrated in the drawings it possesses a generally conical concave shape indicated at 23 in Fig. 1. Radially outside this conical portion is a plane annular portion 20, past which a similar plane annular portion of the rotor runs with close clearance and which defines the outer limit of a cavity within which a portion of the comminuting process performed by the machine takes place. Radially outside the annular portion 20 the stator has formed therein an annular cavity or depression 22, into which project a multiplicity of stator teeth 24 and a multiplicity of rotor teeth 26.

In the embodiment illustrated, the operative surface of the rotor 2 comprises a basically plane face 28 presented to the inner stator cavity, a plane annular portion 30 for cooperation with the annular portion 20 of the stator, and a conical portion 32 which cooperates with the stator structure to define the limits of the stator annular cavity 22 and to form with the stator beyond that cavity a discharge gap from the portions of the machine directly involved in the comminuting process.

The stator member is apertured at 12 on the axis of relative rotation of the rotor and stator members for the admission into the machine of the material to be comminuted or dispersed, in the form of a coarse suspension in a liquid vehicle. The stator member 5 is formed about the opening 12 as required to accept a connection from a source of supply of material to be treated. At the throat of the opening 12, the stator may be provided with a plurality of grooves 14 defining therebetween teeth 16, which cooperate for a preliminary sub-division of coarse particles, if present, by coaction between the teeth 16 and a plurality of impeller blades 18 on the rotor. The blades 18 however serve primarily to pump the entering suspension radially outward into the comminuting elements proper of the machine.

Figure 4:
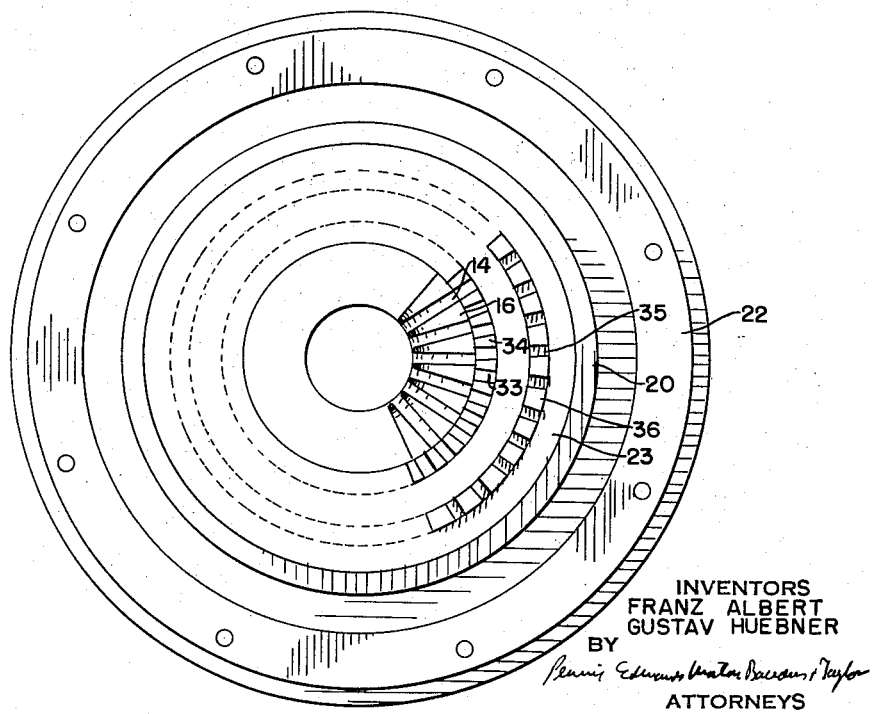
Fig. 4 is a plan view of the stator of the machine of Fig. 1.

The stator is provided, radially outward of the opening 12 and radially inside its annular portion 20, with two concentric ring-shaped arrays of teeth 34 and 36, seen in plan in Fig. 4. The teeth 34 and 36 may be formed by cutting aligned radial slots, indicated at 33 and 35 in Fig. 4, in concentric ridges formed in the stator element 7. These ridges, and hence the teeth 34 and 36 formed therefrom, are bounded by cylindrical surfaces at their radially inner and outer limits, and extend axially slightly beyond the plane of the stator annular portion 20.

In addition to the impeller blades 18, there project from the face 28 of the rotor two concentric ring-shaped arrays of teeth 40 and 42, projecting therefrom axially of the machine to pass with close clearance from the generally conical surface 23 of the stator. Like the stator teeth 34 and 36 the rotor teeth 40 and 42 are formed by the cutting of aligned radial slots, identified at 37 and 39 in Fig. 3, in concentric ridges formed on the rotor member. These rotor ridges are so positioned that the rotor teeth 40 move within and fill to within close tolerances the annular space between the stator teeth 34 and 36. Similarly the stator teeth 36 fill with close clearance the annular space between the arrays of rotor teeth 40 and 42. Advantageously, the rotor may be fitted with annular grooves indicated at 41 and 43 matching respectively the radial positions of stator teeth 34 and 36 in order that the running clearance between the axial ends of the stator teeth 34 and 36 and the rotor may be below the plane face 28 of the rotor, with which the rotor annular face 30 is coplanar. In this manner flow of suspension through the machine along the clearance path between rotor and stator is discouraged, the principal flow path being through the radial slots 33, 35, 37 and 39 as will be more fully described hereinafter.

Preferably each of the arrays of rotor and stator teeth 34, 40, 36 and 42 includes the same number of teeth which are defined by slots of uniform width, equiangularly disposed about the axis of relative rotation of rotor and stator members and milled in a preferably radial direction in both the rotor and stator members. The width of the slots at the radially outer face of the teeth 34 is no larger than the circumferential length of those teeth at the same face thereof. In consequence, except for a small clearance, each tooth in the rotor array 40 is capable of wholly blocking the radial slot 33 between teeth 34. The slots are most conveniently made of constant width and in any event are preferably so proportioned that at each interface between radially adjacent rotor and stator arrays the slots in each of the arrays adjoining that interface have at that interface a circumferential dimension no greater than that of the teeth in the other array there adjoining. Hence a similar alternate opening and closing takes place at both radial ends of the rotor slots 37 and at both radial ends of the stator slots 35.

Figure 5:
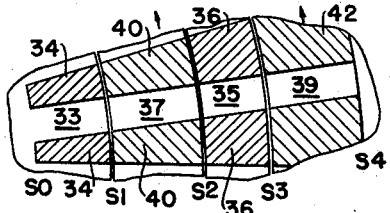
Figs. 5–13 are a series of fragmentary sectional views of the machine of Fig. 1 all taken on the section line 5—5 of Fig. 2 and illustrating different relative rotor and stator positions.

This operation of the machine may be explained in further detail by reference to Figs. 5–13. In Fig. 5 the rotor and stator are shown in the relative position thereof which aligns the rotor and stator teeth and hence the slots 33, 37, 35 and 39 between them, providing maximum total free section for flow of material through the inner conical cavity of the machine extending from the inlet opening 12 to the annular space, indicated at 31 in Fig. 2, between the facing annular stator and rotor portions 20 and 30. Even with the alignment indicated in Fig. 5 the flow section between rotor and stator radially inside the clearance 31 diminishes approximately proportionately with radius, in view of the conical shape 23 of the stator surface by which the slots are in part bounded and in view of the fact that the slots are of uniform width throughout their length radially of the machine.

It is evident from consideration of Figs. 5–13 that upon motion of the rotor, the total free section just referred to undergoes a cyclical variation, at a frequency given by the product of the relative rotational speed of the rotor and stator multiplied by the number of slots in any one circular array of rotor or stator teeth. As will presently appear, the total free section at any phase of the cycle is the product of the number of slots in any one of the arrays of teeth, multiplied by the open cross sectional area at that phase of any one slot at the interface between teeth 36 and 42.

This cyclical variation is accompanied by the formation and preservation during discrete fractions of the cycle of closed chambers in the slots 35 between adjacent stator teeth 36, and by the cyclical formation of closed chambers in the slots 37 between adjacent rotor teeth 40. These chambers, when formed, are closed except for the running clearances of the machine which are small by comparison to the dimensions of the slots.

Figure 11:
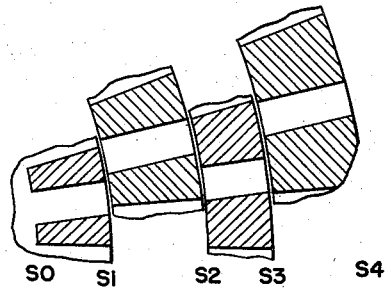
Figure 12:
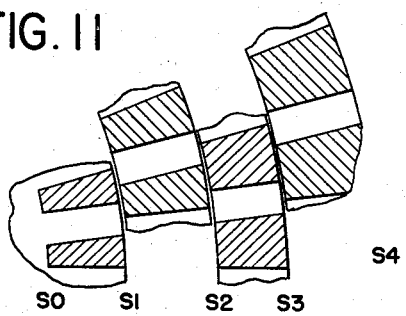
Figure 13:
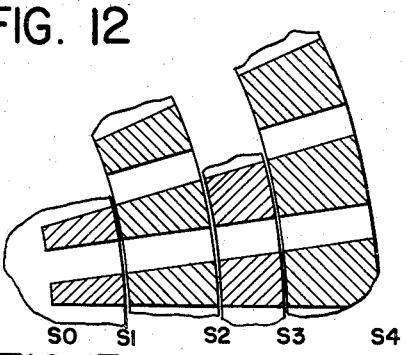

Figs. 5–13 illustrate a number of phases in this cyclical process, beginning in Fig. 5 with radial alignment of rotor and stator teeth and slots respectively, and ending in Fig. 13 with renewed alignment one cycle later. For convenience the circumferential interfaces of the rotor and stator teeth are identified in Figs. 2 and 5–13 as sections $S_0$—$S_4$, beginning with the radially inner face of stator teeth 34 and ending with the radially outer limit of teeth 42. In Fig. 2 additional sections $S_5$—$S_8$ circumferential of the machine axis are identified, and to these reference will later be made.

Figure 6:
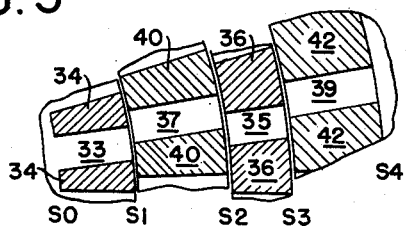

In Figs. 5–13 the rotor, with its teeth 40, 42 and its slots 37, 39, is assumed to rotate counter-clockwise. Fig. 6 shows that, in view of the constant and equal width of all rotor and stator slots 33, 35, 37 and 39, upon such rotation the free section for radial flow through the machine diminishes most rapidly at $S_3$, the radially outermost rotor-stator tooth interface between stator teeth 36 and rotor teeth 42. It may therefore be said that the flow of suspension is regulated primarily at $S_3$, where the flow section is cut off for a longer fraction of the cycle than at either of $S_2$ and $S_1$. The flow section undergoes little change with time at $S_0$ in view of the small number of blades 18 compared to the total number of slots 33. At $S_4$ and $S_7$ the flow sections are invariant with time, being the products of the circumference at those radii by the rotor-stator clearances.

Figure 7:
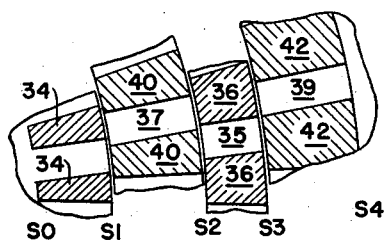

Fig. 7 shows the phase at which radial flow is first blocked off by closing of the flow section at $S_3$. At the phase of Fig. 8 the flow section at $S_2$ is additionally closed off, with the formation of a closed chamber between each pair of adjacent stator teeth 36. These chambers possess in planes perpendicular to the machine axis a substantially rectangular and constantly changing section whereas in planes containing the machine axis the section is substantially trapezoidal.

Figure 9:
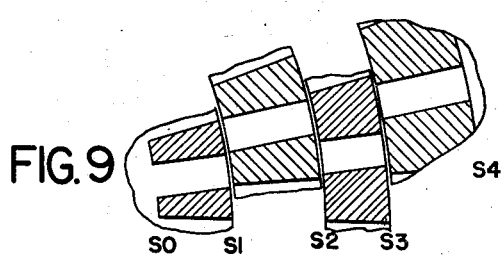

At the phase of Fig. 9 the flow section is further cut off at $S_1$ while remaining closed at $S_2$ and $S_3$, thus forming briefly a closed chamber between each pair of adjacent rotor teeth 40.

Figure 10:
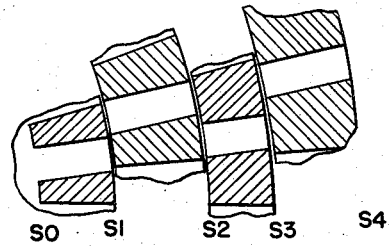
Figure 8:
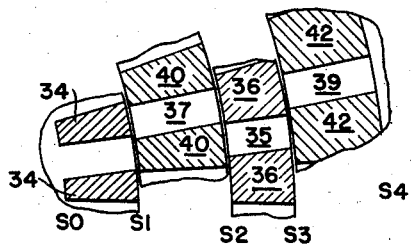

Figs. 10, 11 and 12 in the second half of the cycle show phases corresponding respectively to those of Figs. 8, 7 and 6. Thus in Fig. 10 the flow section at $S_1$ has reopened and that at $S_2$ is on the point of doing so, while in Fig. 11 the sections at $S_1$ and $S_2$ have both reopened while that at $S_3$ is on the point of doing so.

In consequence of this construction the material undergoing comminution is subjected, in its passage from the radial position of section $S_0$ to that of $S_4$, to a succession of radial and tangential accelerations and to multiple compressional waves which will be presently described in greater detail.

At the outer limit of the annular clearance 31 which follows the arrays of teeth 34, 40, 36 and 42, the space between rotor and stator opens into the annular cavity 22, the height of which is large compared to the height of the clearance 31. Moreover the height of the cavity 22 increases with increasing radius in view of the conical conformation of the rotor at 32. The cavity 22 is limited at its radially outer side by an annular cylindrical face 46 and by the stator teeth 24, and the cavity discharges into the space 19 through a narrow gap 45 between the rotor conical face 32 and a matching conical face 47 on the stator ring 9. Within the cavity 22 the rotor teeth 26, uniformly spaced and extending radially of the machine axis, move at close clearance from the radially extending stator teeth 24, which are conveniently provided in equal number. The teeth 24 may be formed by milling slots into the two halves of the stator ring 9, which is assembled with the remainder of the stator into position over the rotor by means of bolts 44. The principal faces of teeth 24 and 26 therefore lie in planes containing the axis of rotation of the machine. The teeth 24 and 26 of cavity 22 are preferably finer and much more numerous than those in the ring-shaped arrays within the conical cavity of the machine radially inside the clearance 31, and they confront each other with close clearance along edges which are generally transverse to the flow of material through the machine. In the embodiment illustrated the teeth 24 and 26 are shaped to confront each other at two interfaces, one between edges of those teeth parallel to the machine axis and the other between edges of those teeth perpendicular to the machine axis, the teeth 26 thus having a reentrant notched profile accommodating the triangular profile of teeth 24. Moreover the teeth 26 extend across the discharge gap 45, from rotor face 32 in the vicinity of that gap to the stator wall 46, thus forcing all of the suspension passed through the machine to flow through the teeth 26. The teeth 24 also extend from the gap 45 to the wall 46.

The machine of the invention is preferably fed with a homogeneous suspension, previously prepared by appropriate apparatus which may be of known type, of particles of small dimensions such as 0.5 mm. diameter for example, in a substantially incompressible fluid such as water. The suspension may be supplied to the machine at its inlet opening 12 without appreciable pressure, the centrifugal pumping action of the machine assuring passage of the suspension therethrough.

From the inlet the suspension is impelled radially outward by the blades 18, which need be provided in a small number only, for example four. At their passage across each of the circumferential interfaces at $S_0$—$S_3$ between successive arrays of teeth (counting the blades 18 as teeth for the moment), the suspended particles are subjected to a violent tangential acceleration, positive or negative. These accelerations increase in intensity with the radial position of the interface in question in view of the increase in tangential velocity of the rotor portions with increasing radius. Between the section $S_4$ at the radially outer limit of rotor teeth 42 and the radially outer limit of the clearance 31, identified in Fig. 2 at $S_5$, the suspended particles undergo a negative acceleration and a laminating action. Between $S_5$ and the entrance to the discharge gap 45 at $S_6$ the suspended particles undergo additional tangential accelerations. The first of these is at $S_5$ on passing from the clearance 31 into the spaces between adjacent rotor teeth 26. Some of the suspended particles may pass directly at $S_6$ from between the teeth 26 to the discharge gap or clearance 45 in which they suffer a relatively gradual deceleration until upon emerging therefrom at $S_7$ they are once more accelerated tangentially by the exhaust blades 25. Most of the suspended particles however, particularly if they possess a density substantially higher than that of the liquid vehicle, undergo sedimentation or centrifuging against the cylindrical face 46, located axially at the height of clearance 31 and radially at the outer boundary of cavity 22, where they are subjected to high frequency pressure waves by the alternate alignment and misalignment of the rotor and stator teeth 26 and 24. Particles brought by sedimentation against the cylindrical wall 46 migrate toward the discharge gap 45 and have their tangential velocity again brought to zero when they pass between adjacent stator teeth 24, from which they pass into the discharge gap with or without a further acceleration by passage once more between rotor teeth 26.

The tangential accelerations at $S_0$—$S_5$ and at $S_6$ and $S_7$ are imposed on all particles passed through the machine and are therefore independent of the rate of through-put. The general character thereof is indicated at the discontinuities in the plot of tangential velocities of Fig. 14, derived from computations made with respect to a particular machine according to the invention which has been constructed and successfully operated and which will be presently described.

The suspended particles and the liquid vehicle in which they are supported are subjected not only to the tangential accelerations just discussed but also to radial accelerations which impose large forces on the suspended particles. These radial accelerations are the consequence of the discontinuous flow through the machine produced by the cyclical change in the flow section therethrough, and manifest themselves in a discontinuously changing radial velocity for the suspension, which moves radially through the machine with a series of pulse-like motions, illustrated in Fig. 14 in the plot of radial velocities for successive radial positions in the particular machine according to the invention to which reference has been made.

This machine, of which the rotor and stator are shown in Figs. 3 and 4, included four impeller blades 18 centrally disposed on the rotor, 42 teeth in each of the rotor and stator ring-shaped arrays within the conical portion of the machine, and 265 rotor and stator teeth within the annular cavity 22. Its radial dimensions were as follows:

| Circumferential Section | $S_0$ | $S_1$ | $S_2$ | $S_3$ | $S_4$ | $S_5$ | $S_6$ | $S_7$ | $S_8$ |
|---|---|---|---|---|---|---|---|---|---|
| Diameter in cm | 10.7 | 13.4 | 16.0 | 18.0 | 20.6 | 22.6 | 25.5 | 26.7 | 27.2 |

The slots between adjacent teeth of each of the ring-shaped arrays within the conical portion of the machine were all 0.5 cm. wide throughout their length in planes perpendicular to the machine axis, and at $S_0$ were 1 cm. in height, i.e. in dimensions parallel to the machine axis. The annular cavity 22 had a mean radial dimension of 1.2 cm. and a mean height of 0.8 cm., the spacing of adjacent rotor blades 24 and of adjacent stator blades 26 in cavity 22 being 1 mm. The running clearances between rotor and stator elements ranged between 0.2 and 0.5 mm.

This machine when rotated at 2,880 r.p.m. had a through-put of four liters per second of suspension, with substantially no pressure at the inlet end. Computations on this machine gave for the radial and tangential velocity of the suspension passed through it under these operating conditions the data plotted in Fig. 14. As indicated in that figure by the discontinuities in the tangential velocity curve, the suspension with its suspended particles was subjected to severe tangential accelerations at each of the interfaces $S_0$, $S_1$, $S_2$ and $S_3$, and to a somewhat more gradual tangential acceleration (negative) on passing radially outward beyond the section $S_4$. At $S_5$ the suspension was again accelerated to a high tangential velocity from which it was slowed down on passing through the discharge gap between $S_6$ and $S_7$, while at $S_7$ it was accelerated tangentially to the speed of the discharge blades 25. These tangential velocities were computed directly as the tangential velocity of the rotor of the machine in question, at its successive circumferential sections $S_0$—$S_8$, when rotated at 2,880 r.p.m.

The plot in Fig. 14 of radial velocities within the portion of the machine extending from $S_0$ to $S_4$ was developed from consideration of the cyclical variation of the flow section at $S_3$, and from the mean radial velocity obtaining in the fraction of the cycle during which flow is not completely closed off at $S_3$, required to match the through-put rate of four liters per second. The portion of the plot between $S_5$ and $S_8$ was developed from similar considerations applied to the cavity 22. As indicated in Fig. 14 by the discontinuities in radial velocity, the suspension was in the machine of Figs. 3 and 4 subjected to some three radial pulses of motion in its passage between $S_0$ and $S_1$, to three more between $S_1$ and $S_2$, to two between $S_2$ and $S_3$, to two between $S_3$ and $S_4$, and to one between $S_4$ and $S_5$. The radial distance covered in the course of these pulses and hence the number of pulses occurring in each stage of the machine can be estimated for any machine according to the invention by multiplying for the radial position at which the pulses individually take place the average radial velocity over the fraction of the cycle during which the instantaneous radial velocity is not zero by the time duration of that fraction of the cycle. In the machine illustrated in Figs. 3 and 4 the pulses varied in length between approximately 2 mm. at $S_0$ and 10 mm. at $S_5$.

Within the cavity 22, by virtue of the high frequency of 12,700 c.p.s. at which the rotor teeth 26 passed the stator teeth 24 in the machine of Figs. 3 and 4 whose operation is plotted in Fig. 14, and by virtue of the low mean radial velocity resulting from the large height of cavity 22, the radial flow through the cavity 22 is made up of the sum of a large number of pulse-like motions in which a relatively small increment of velocity is added to a slowly decreasing "constant" component of velocity attributable to the constant open discharge gap 45. Between $S_0$ and $S_5$ on the other hand, the flow section contributed by the clearances is small by comparison with that contributed by the channels 33, 37, 35 and 39, so that the residual velocity between impulses is very low.

While the numerical values of Fig. 14 are peculiar to the particular machine whose dimensions and mode of operation have been given, Fig. 14 is representative of the action of the machines of the invention generally. In general the number of pulses making up the radial motion of the suspension is dependent on the through-put. With a high through-put the number of pulses is low, each one having a large amplitude, i.e. carrying the suspension of a relatively large portion of the radial path involved in passage through the machine. With a low through-put, there occur a larger number of pulse motions of lower amplitude.

The tangential and radial accelerations with their concomitant forces which result in a pulse-like motion of the suspension through the machine are accompanied by compressional waves which are generated through the machine, in particular lengthwise of the conduits established by the slots 33, 37, 35 and 39. For example, assuming water as the fluid vehicle with a velocity of propagation for sonic waves of 1,435 meters per second, Michaud's formula for the pressure created by the closing in a known time of flow through a rigid pipe of known length through which a fluid flows with known velocity indicates that on passage of the rotor and stator from the position of coincidence of rotor and stator slots illustrated in Fig. 5 to the position of closure at $S_3$ illustrated in Fig. 7 the excess pressure achieved in the particular machine according to the invention which has been described is of the order of 10 kg. per cm.$^2$ Thus the machines of the invention, in addition to any conventional and incidental shearing or crushing of the suspended matter by direct mechanical action between elements of the rotor and stator structure, operates by the development of impulse forces which, in the embodiment illustrated, occur at three different frequencies simultaneously operative at different radial portions of the machine. In the particular machine whose operation at 2,880 r.p.m. has been described, the lowest of these frequencies is 192 cycles per second, corresponding to a rotation speed of 48 r.p.s. and to four rotor impeller blades 18 moving with relatively small clearance past the stator teeth 34 of the innermost array. At each of the interfaces $S_1$, $S_2$ and $S_3$ and in particular at $S_3$, the cyclical frequency of pulse generation is 2,016 cycles per second corresponding to the product of 48 revolutions per second and 42 teeth. In the annular cavity 22 the impulse frequency is 12,700 cycles per second corresponding to the rotational speed of 48 revolutions per second and the 265 rotor teeth which in each revolution are carried past each stator tooth 24. Examination of machines which have been used for substantial periods of time show localized evidences of wear indicative of superposition of these frequencies in the portions of the machine adjacent to the interfaces where the pulse frequency changes.

While the invention has been described in terms of a preferred embodiment, variations may be made in its structure departing from that shown in the drawings and described herein without departure from the invention itself, which is defined in the appended claims. The number of circular arrays of teeth on the two members may be varied from a minimum of one array on each. Moreover the existence of these arrays, which result in the formation of radial conduits of time-varying section and of closed chambers therein when at least two arrays are provided on one of the members, is consistent with the existence of other comminuting elements within the machine, for example the central slots for teeth 14 and 16 in the example of the invention described, which do not match in number or position the arrays of equally numerous teeth 34, 40, 36 and 42.

We claim:

1. Comminuting apparatus comprising two relatively rotatable members, each of said members having a surface conforming to a separate surface of revolution, said members being mounted for relative rotation with their said surfaces facing each other in coaxial relation, said surfaces being shaped to permit the mounting of said members with a narrow clearance therebetween at portions thereof displaced from their axis of relative rotation, one of said members being apertured adjacent said axis for admission of a material to be comminuted to the space between said members radially inside said portions, a circular array of projections arranged on one of said surfaces, two circular arrays of projections arranged on the other of said surfaces, said arrays being positioned coaxially of said axis radially inside said portions with the array on said one surface positioned radially between the two arrays on the other of said surfaces with close cylindrical clearances between the projections on said one surface and those on said other surface, all of said arrays including the same number of projections evenly spaced from each other by spaces not exceeding at said cylindrical clearances the circumferential dimension of the projections in the radially adjacent arrays, said members being shaped to define radially outside the clearance between said portions an annular space between said members closed at the radially outer limit thereof except for an annular discharge slit for passage of material out from between said members, and a multiplicity of teeth arranged on each of said members to present at least one edge thereof to said space, said teeth having faces lying substantially in planes containing said axis, the teeth of said multiplicities moving past each other on relative rotation of said members with close clearance between edges thereof extending across said space substantially from one of said members to the other thereof.

2. Comminuting apparatus comprising two relatively rotatable members, each of said members having a surface conforming to a separate surface of revolution, said members being mounted for relative rotation with their said surfaces facing each other in coaxial relation, said surfaces being shaped to permit the mounting of said members with a narrow clearance therebetween at portions thereof displaced from their axis of relative rotation, one of said members being apertured adjacent said axis for admission of a material to be comminuted to the space between said members radially inside said portions, a circular array of projections arranged on one of said surfaces, two circular arrays of projections arranged on the other of said surfaces, said arrays being positioned coaxially of said axis radially inside said portions with the array on said one surface positioned radially between the two arrays on the other of said surfaces with close cylindrical clearances between the projections on said one surface and those on said other surface, all of said arrays including the same number of projections evenly spaced from each other by spaces not exceeding at said cylindrical clearances the circumferential dimension of the projections in the radially adjacent arrays, said members being shaped to define an annular cavity therebetween radially outside said portions, said cavity being bounded at its radially outer limit by a substantially cylindrical wall in said one of said members coaxial in said axis, said cavity having a gap between said members for discharge of material from said cavity adjacent one axial end of said wall, a multiplicity of teeth projecting within said cavity from said wall adjacent said gap, and a multiplicity of teeth arranged on the other of said members to project within said cavity from the other of said members adjacent said gap and to pass with close clearance said wall and the teeth of said first multiplicity.

3. Comminuting apparatus comprising rotor and stator members having each a surface coaxial in the axis of relative rotation of said members, at least one of said surfaces having a concave portion coaxial in said axis, means to support said members for relative rotation in said axis with close clearance therebetween radially outside said portion whereby there is defined between said members a rotationally symmetric space of dimension parallel to said axis diminishing with increased distance from said axis, a plurality of circular arrays of projections arranged on each of said surfaces radially inside said clearance, adjacent arrays on each of said surfaces being radially spaced to accommodate with close clearance therebetween the projections of an array on the other of said surfaces, said projections extending axially from the surfaces on which they are arranged to pass the other of said surfaces with close clearance, all of said arrays including the same number of projections, adjacent projections in all of said arrays being spaced by intervals of substantially the same circumferential extent, said circumferential extent not exceeding the circumferential dimension of the projections of the radially innermost of said arrays, an annular cavity formed between said members radially outside said concave portion, said cavity being formed with a discharge gap therefrom at its radially outer limit, and a multiplicity of teeth arranged on each of said members extending axially of said cavity from said discharge gap on opposite sides thereof, said teeth moving past each other on motion of said rotor with close clearance therebetween at edges thereof extending axially of said cavity.

References Cited in the file of this patent
UNITED STATES PATENTS

| | | |
|---|---|---|
| 2,738,930 | Schneider | Mar. 20, 1956 |
| 2,738,931 | Schneider | Mar. 20, 1956 |